June 30, 1970     C. C. HANSON ET AL     3,518,440
PHOTOELECTRIC SENSING APPARATUS
Filed April 26, 1967     2 Sheets-Sheet 1
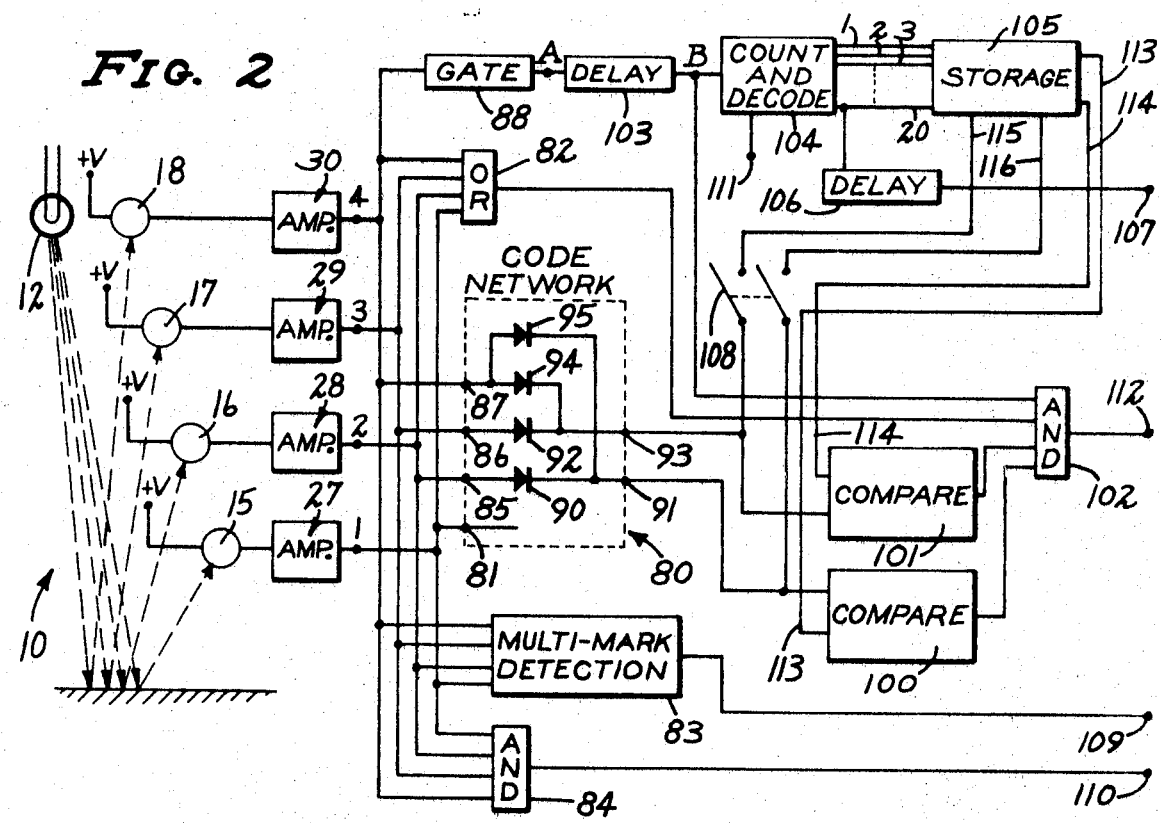
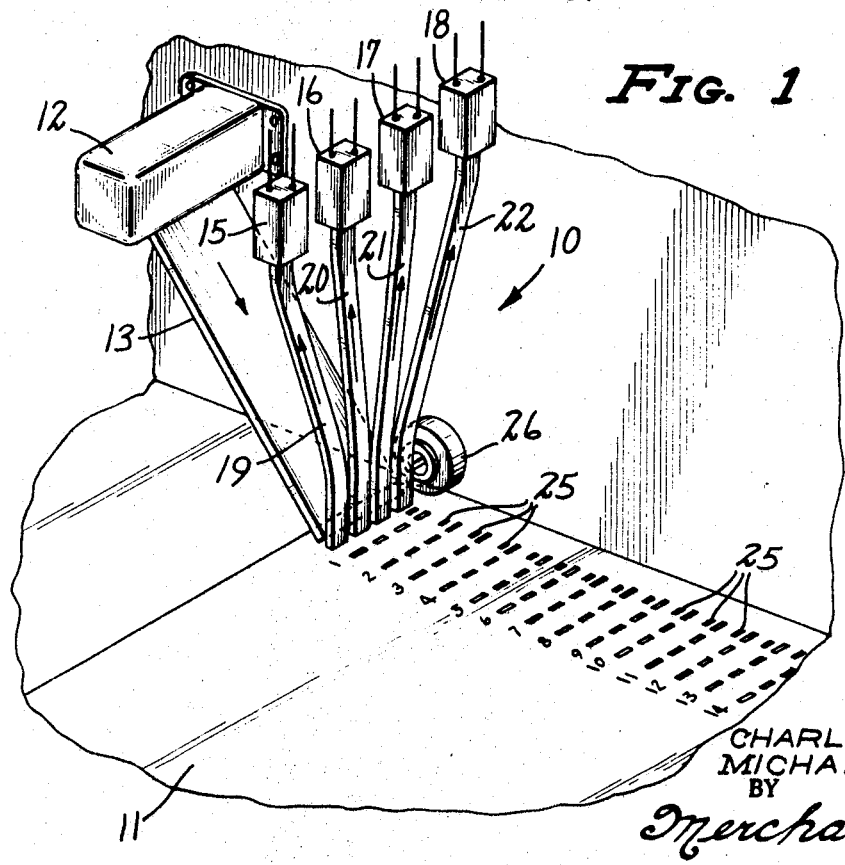
INVENTOR.
CHARLES C. HANSON
MICHAEL SOKOLSKI
BY
Merchant & Gould
ATTORNEYS

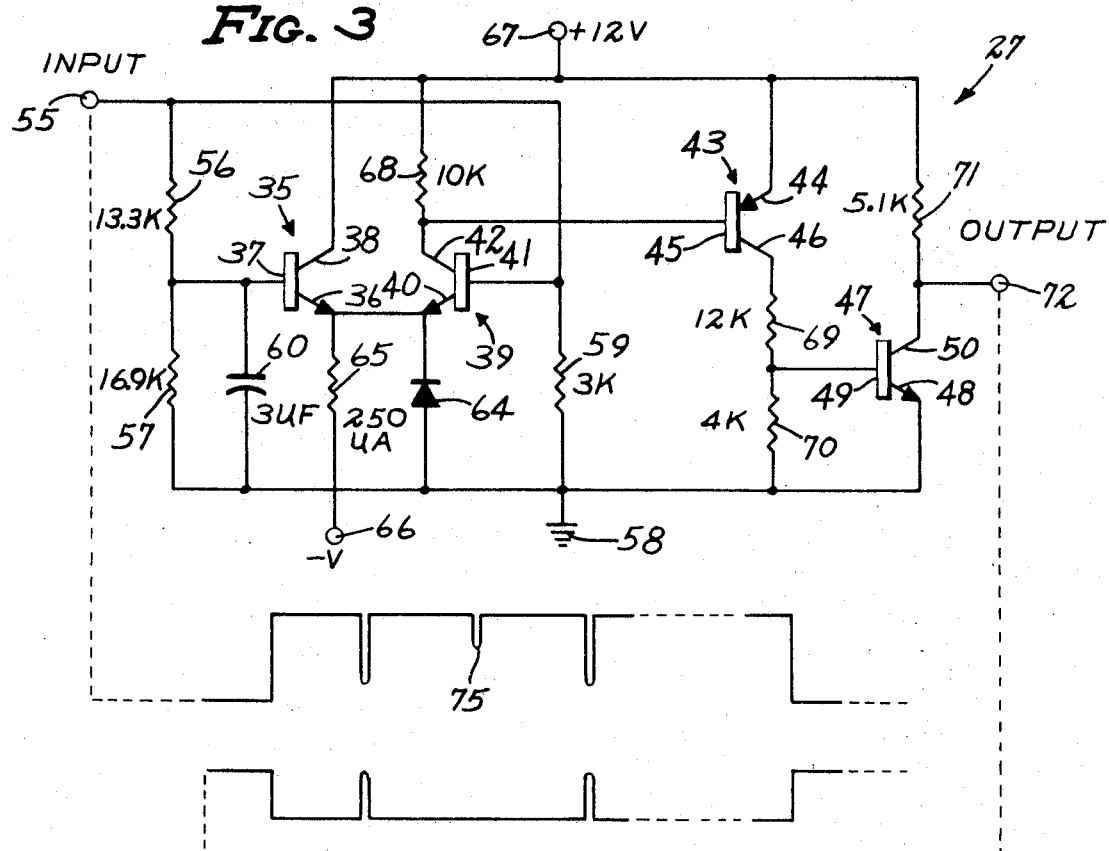
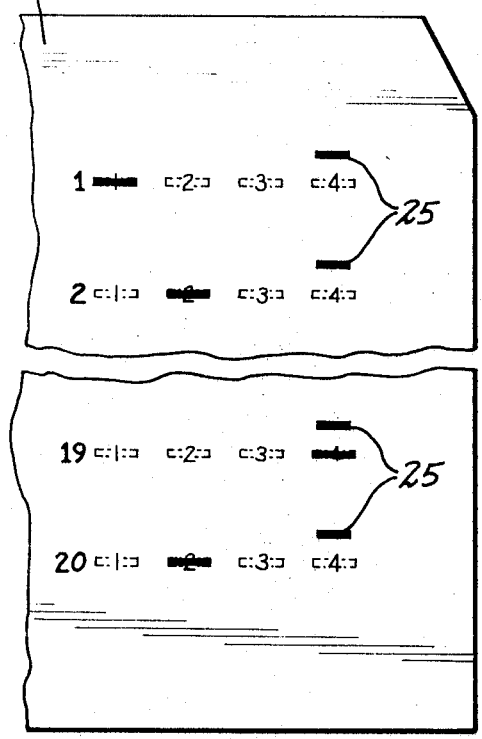
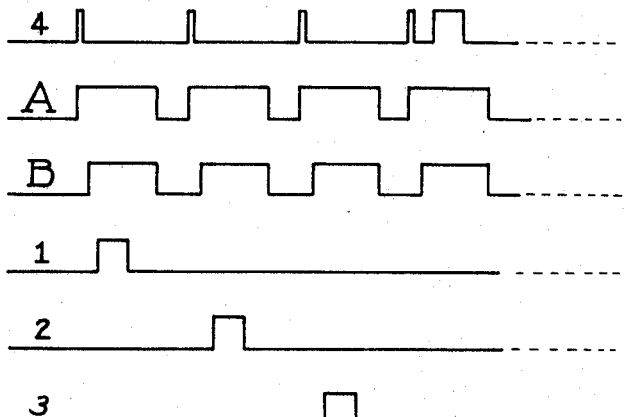

United States Patent Office 3,518,440
Patented June 30, 1970

3,518,440
PHOTOELECTRIC SENSING APPARATUS
Charles C. Hanson and Michael Sokolski, Rochester,
Minn., assignors to Rochester Datronics, Inc.,
Rochester, Minn., a corporation of Minnesota
Filed Apr. 26, 1967, Ser. No. 633,880
Int. Cl. G08c 9/06
U.S. Cl. 250—219
10 Claims

ABSTRACT OF THE DISCLOSURE

Apparatus for determining the position of a series of marks on a piece of paper, such as a multiple choice test paper or the like, comparing the positions to a standard sheet having correctly positioned answers thereon, and indicating the incorrectly positioned marks on the test sheet. The apparatus includes four light sensitive means each having light conducting plastic or the like associated therewith and positioned to receive reflected light from the surface of the paper. When a mark passes beneath the light conducting plastic, the light reaching the light sensitive means is substantially reduced and the electrical output of the light sensitive means is substantially reduced. Each of the light sensitive means has a differential amplifier associated therewith which provides an electrical output signal only when the light sensitive means senses a mark on the paper. One of the light sensitive means also senses periodic timing marks, and the timing signals produced by the amplifier associated therewith are transmitted to a storage unit which, upon the reception of a timing signal, provides an electrical signal indicative of the correct position of the subsequent mark. The outputs of the four amplifiers are coded into binary signals and compared with the output of the storage unit in logic circuitry, the output of which activates indicating units for indicating when a mark is positioned correctly or incorrectly. Circuitry is also included for deactivating the indicating units when two or more marks are present simultaneously, and for placing the desired information in the storage unit by connecting the outputs of the amplifiers thereto.

BACKGROUND OF THE INVENTION

Field of the invention

The present invention is especially useful for automatically scoring test sheets of the multiple choice type wherein a light source is positioned to direct rays of light at a plurality of light sensitive devices, and a paper, card, or the like, having some indicia thereon designed to vary the amount of light reaching the light sensitive means as the paper or card is moved past the light sensitive means, is adapted to be moved slowly through the machine so that each indicia is compared to a standard indicia.

Description of the prior art

In the prior art, many types of photoelectric sensors are utilized wherein direct or reflected light is received by a plurality of light sensitive devices, one of which is especially adapted to receive timing signals and no other signals. In addition, the amplifiers utilized are adapted to receive positive going electrical pulses from the light sensitive means and in many instances, these prior art amplifiers cannot distinguish between a mark and an erasure or the like. Most of these prior art devices have extremely complicated electronic circuitry associated therewith, and much time and effort is required in supplying the apparatus with the standard information to which the test sheets, cards, etc., are to be compared.

SUMMARY OF THE INVENTION

This invention pertains to photoelectric sensing apparatus, and more particularly to apparatus having a plurality of channels for sensing the position of a series of indicia placed on a piece of material, each of said channels including a differential amplifier for providing an electrical output only when a definite indicia is sensed, and electronic circuitry connected to one of said channels so that said channel can be utilized for sensing timing marks as well as indicia, which timing marks provide a timing signal that is utilized to gate a storage unit so that the series of indicia are compared to a standard series of indicia, and incorrectly positioned indicia are indicated.

It is an object of the present invention to provide a new and improved photoelectric sensing apparatus.

It is a further object of the present invention to provide a photoelectric sensing apparatus wherein one of the light sensitive devices is utilized to sense timing marks as well as indicia.

It is a further object of the present invention to provide photoelectric sensing apparatus including new and improved amplifying means.

It is a further object of the present invention to provide photoelectric sensing apparatus which is relatively inexpensive to produce and simple to operate.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in perspective of the read head and paper driving mechanism;

FIG. 2 is a block diagram of the read head and attached electronics in the over-all apparatus;

FIG. 3 is a schematic view of a single amplifier, illustrating a typical input and output wave form;

FIG. 4 is a chart illustrating the wave forms appearing at various points in the block diagram of FIG. 2, and the time relationship therebetween; and FIG. 5 is a partial view of a typical paper illustrating the indicia and timing marks thereon.

DESCRIPTION OF THE PREFERRED EMBODIMENT

Referring to FIG. 1, the read head generally designated 10, is illustrated with a test paper 11 correctly positioned therebelow. The read head 10 includes a light source 12, having light conducting means 13 associated therewith for conducting the light from the light source 12 to a desired area at the surface of the test paper 11, and four light sensitive devices, 15 through 18, each having light conducting means 19 through 22 associated therewith respectively for receiving light from a particular area at the surface of the test paper 11. The light conducting means 13 and 19 through 22 can be fiber-optic bundles, any of the many plastics capable of conducting light axially therethrough, or any other means of conducting the light from definite areas at the surface of paper 11. Referring to the test paper 11, which can be seen in FIGS. 1 and 5, indicia or marks made by a particular marking instrument, such as a number 2 lead pencil or the like, numbered 1 through 20 are sequentially positioned along the right edge thereof. Each indicia has four possible positions in which it can be placed, which positions coincide simultaneously with the lower ends of the light conducting means 19 through 22. In general, the test paper 11 will have a question thereon with four possible answers and each answer is represented by one of the positions in which the indicia can be placed. Immediately preceding the fourth position of each indicia is a timing mark, designated 25. Prior to the four possible positions of any of the indicia coinciding with the areas below the light conducting means 19 through 22, a timing mark 25 coincides with the area below the light conducting means 22. As the test paper 11 is moved through the photoelectric sensing apparatus, by a driving wheel 26 or by hand, the timing marks 25 and the indicia substantially reduce the amount of light entering the light conducting means 19 through 22, and therefore, substantially reduce the electrical signal provided by the light sensitive devices 15 through 18.

Referring to the block diagram in FIG. 2, it can be seen that each of the light sensitive devices 15 through 18 is connected to an amplifier 27 through 30, respectively. Each of the amplifiers 27 through 30 is similar, and for purposes of explanation, the amplifier 27 is illustrated schematically in FIG. 3. The amplifier 27 includes a first transistor generally designated 35, having an emitter 36, a base 37, and a collector 38; a second transistor, generally designated 39, having an emitter 40, a base 41, and a collector 42; a third transistor, generally designated 43, having an emitter 44, a base 45, and a collector 46; and a fourth transistor, generally designated 47, having an emitter 48, a base 49, and a collector 50. In the present embodiment, the first, second, and fourth transistors 35, 39, and 47 are N-P-N transistors while the third transistor 43 is a P-N-P type of transistor. It should be understood, however, that the particular type of transistor utilized as well as the specific embodiment of the amplifier, to be described presently, have been chosen for convenience and ease of explanation, and many other embodiments will occur to those skilled in the art, all of which are within the scope of this invention.

An input 55, connected to the output of the light sensitive device 15, is connected directly to the base 41 of the second transistor 39 and to one end of a resistor 56. The other end of the resistor 56 is connected through a resistor 57 to ground, designated 58. The base 41 of the second transistor 39 is also connected to ground 58 through a resistor 59. The junction of the resistors 56 and 57 is connected to the base 37 of the first transistor 35. A capacitor 60 is connected in parallel with the resistor 57 between the base 37 of the first transistor 35 and the ground 58. The emitters 36 and 40 of the transistors 35 and 39 are connected together and to one end of a resistor 65, the other end of which is connected to a negative voltage supply (not shown) at a terminal 66. The cathode of a diode 64 is connected to the emitters 36 and 40 of the transistors 35 and 39, and the anode of diode 64 is connected to the ground 58. The collector 38 of the transistor 35 is connected directly to a positive 12-volt supply (not shown) at a terminal 67. The collector 42 of the transistor 39 is also connected to the positive 12-volt supply at terminal 67 through a resistor 68. The base 45 of the transistor 43 is connected directly to the collector 42 of the transistor 39. The emitter 44 of the transistor 43 is connected directly to the terminal 67 of the 12-volt supply. The collector 46 of the transistor 43 is connected to one end of a resistor 69. The other end of the resistor 69 is connected to one end of a resistor 70, the other end of which is connected to ground 58. The base 49 of the transistor 47 is connected to the junction of the resistors 69 and 70, and the emitter 48 is connected directly to the ground 58. The collector 50 of the transistor 47 is connected through a resistor 71 to the terminal 67 of the 12-volt supply, and an output is obtained at a terminal 72 connected directly to the collector 50 of the transistor 47. Values for the various components of the amplifier 27 are illustrated in FIG. 3, except for the value of the resistor 65 and negative voltage supply at terminal 66, which are adjusted according to the transistors 35 and 39 so that the current flowing through the resistor 65, when the signal at the input 55 is a maximum, is approximately 250 micro amperes.

Referring to the schematic diagram of the amplifier 27 and the wave forms shown in FIG. 3, the operation of the amplifier 27 is as follows. When a test paper 11 is placed beneath the light conducting means 13 and 19 through 22, light is reflected into the light sensitive devices 15 through 18, and a maximum input signal is applied to terminal 55 of the amplifier 27. As the paper is moved through the sensing apparatus, eventually an indicia will coincide with the light conducting means 19 and a sharp negative pulse will appear at the input 55. When the positive signal is applied at the input 55, the transistor 39 is turned on hard because of the direct consection of the base 41 to the input 55. The transistor 35 will not receive as large a positive signal at the base 37 because of the voltage divider formed by resistors 56 and 57 and, therefore, because of the differential amplifier action caused by resistor 65 in the common emitter circuit, the transistor 35 will be turned off. Because the transistor 39 is turned on, the base 45 of the transistor 43 is negative relative to the emitter 44, and the transistor 43 is turned on. With the transistor 43 turned on, the base 49 of the transistor 47 is positive relative to the emitter 48, and the transistor 47 is turned on. When the transistor 47 is on, the output 72 is at approximately ground potential and no output is present. When the sharp negative pulse appears at the input 55 because of the indicia below the light conducting means 19, the base 41 of transistor 39 suddenly goes negative tending to shut the transistor 39 off. However, because the capacitor 60 connected to the base 37 of the transistor 35 has charged to a value equal to the product of the maximum input voltage and the value of the resistor 57 divided by the sum of the values of the resistors 56 and 57, when the amplitude of the input voltage drops below the value of the charge on capacitor 60, the base 37 of transistor 35 will be more positive than the base 41 of transistor 39. Thus, the negative signal will cause a switching action and transistor 39 will turn off while transistor 35 will turn on. When transistor 39 turns off, the base 45 of transistor 43 is at approximately the same voltage as the emitter 44, and transistor 43 will turn off also. When transistor 43 turns off, the base 49 of transistor 47 is at approximately ground potential, and transistor 47 will turn off. Turning transistor 47 off provides a high impedance between the output 72 and ground 58 which raises the voltage at the output terminal 72 and provides an output as illustrated in the wave form.

When an erasure or the like reduces the light reaching one of the light sensitive devices to produce a slight negative pulse, as illustrated in FIG. 3 at 75, this slight negative pulse causes the base 41 of the transistor 39 to go negative, but until the pulse at 75 is sufficiently large to cause the base 41 to go more negative than the base 37, there will be no effect on the amplifier 27. Thus, the amplifiers 27 through 30 effectively differentiate between indicia and other marks, such as erasures and the like, to greatly increase the accuracy of the sensing apparatus. The amplifiers 27 through 30 can be set to discriminate between any level of input signals by adjusting the ratio of the resistors 56 and 57. Because the pulses produced by the indicia have a much shorter period than the normal period, which establishes the amplitude of voltage on the capacitor 60, the voltage on the capacitor 60 stays essentially constant throughout the time the test paper 11 is being read. The diode 64 clamps the differential acting transistors 35 and 39 so that they cannot drift back to the normal or high input state when no paper is present in the apparatus.

The output of the amplifier 27 is connected to an input 81 of a code network generally designated 80, an input of an OR circuit 82, an input of a multi-mark detection circuit 83, and an input of an AND circuit 84. The output of the amplifier 28 is connected to an input 85 of the code network 80, an input of the OR circuit 82, an input of the multi-mark detection circuit 83, and an input of the AND circuit 84. The output of the amplifier 29 is connected to an input 86 of the code network 80, an input of the OR circuit 82, an input of the multi-mark detection circuit 83, and an input of the AND circuit 84. The output of the amplifier 30 is connected to an input 87 of the code network 80, an input of the OR circuit 82, an input of the multi-mark detection circuit 83, an input of the AND circuit 84, and an input of a gate producing circuit 88, which may be a single-shot multivibrator or the like.

The input 81 of the code network 80 is not connected to anything within the code network 80 so that an output on the amplifier 27 has no effect on the code network 80. The input 85 of the code network 80 is connected to a diode 90, so that an output signal of the amplifier 28 will pass freely through the code network 80 to an output line 91. The input 86 of the code network 80 is connected to a diode 92 so that an output of the amplifier 29 will pass freely through the code network 80 to an output line 93 thereof. The input 87 of the code network 80 is connected to two diodes 94 and 95, so that an output of the amplifier 30 will pass freely through the code network 80 and provide a signal at both of the output lines 91 and 93. Thus, the outputs of the amplifiers 27 through 30 are coded onto two lines 91 and 93 in the following manner. An output from amplifier 27 produces no effect on the lines 91 and 93. An output from the amplifier 28 produces a pulse on the line 91. An output from the amplifier 29 produces a pulse on the line 93. An output from the amplifier 30 produces a pulse on the lines 91 and 93.

The output line 91 of the code network 80 is connected to the input of a comparing circuit 100, and the output line 93 of the code network 80 is connected to the input of a comparing circuit 101. The outputs of the comparing circuits 100 and 101 are connected to two inputs of an AND circuit 102. The output of the OR circuit 82 is connected to a third input of the AND circuit 102. The gate produced by the gate circuit 88 is conducted through a delay circuit 103 and the output of the delay circuit 103 is connected to a fourth input of the AND circuit 102. The output of the delay circuit 103 is also applied to an input of a count and decode circuit 104. The count and decode circuit 104 has 20 outputs, each representative of one of the 20 indicia on the test paper 11, all 20 of which are connected to 20 inputs of a storage circuit 105, and the 20th of which is also connected to the input of a delay circuit 106. The output of the delay circuit 106 is connected to a terminal 107 which, when energized, actuates a print hammer (not shown). The 20 outputs of the count and decode circuit 104 are illustrated representatively, that is, the first three and the 20th outputs are shown. The storage circuit 105 has two outputs 113 and 114 which are connected as inputs to the comparing circuits 100 and 101. The storage circuit 105 also has a pair of inputs 115 and 116 which are connected through a double-pole single-throw switch 108 to the output lines 91 and 93 of the code network 80. The multi-mark detection circuit 83 has an output connected to a terminal 109 which is in turn connected to the print hammer when the terminal 109 is energized. The AND circuit 84 has an output connected to a terminal 110, which is connected to a reset terminal 111 of the count and decode circuit 104 and to a reset on a print wheel (not shown). The AND circuit 102 has an output connected to a terminal 112, which is connected to the print wheel and activates the print wheel when a signal is received at the terminal 112.

In the operation of the apparatus illustrated in block form in FIG. 2, when a timing mark 25 on the test paper 11 coincides with the light conducting means 22, a pulse is produced by the amplifier 30 which is applied to the code network 80, the OR circuit 82, the multi-mark detection circuit 83, the AND circuit 84, and the gate circuit 88. The timing pulse has no effect on any of this apparatus except the gate circuit 88, since there is nothing to compare the pulse with in the comparing circuits 100 and 101. In the gate circuit 88, a gate is produced as illustrated by the wave form A in FIG. 4. The gate produced by the gate circuit 88 is delayed slightly in the delay circuit 103 so that it coincides with the pulses produced by the indicia. In the count and decode circuit 104, the first timing gate produces a signal on the first output line which is applied to the storage circuit 105. This pulse on the first line causes the storage circuit 105 to provide a signal, which signal was previously supplied to the storage circuit 105 through the switch 108 and inputs 115 and 116, at the outputs 113 and 114 connected to the inputs of the comparing circuits 100 and 101.

Subsequent to the timing pulse 25 an indicia (in the FIG. 5 the indicia is placed in the first position) coincides with one of the light conducting means 19 through 22 and provides a signal at the output of one of the amplifiers 27 through 30. With the indicia in the first position, the amplifier 27 provides an output which is supplied to the input 81 of the code network 80 the OR circuit 82, the multi-mark detection circuit 83, and the AND circuit 84. Since there is only one indicia appearing in the four possible positions, the multi-mark detection circuit 83 and the AND circuit 84 are not affected by the single pulse. Also, since the input 81 is not connected to anything in the code network 80, no signals appear on the output lines 91 and 93 thereof. The pulse applied to the OR circuit 82 passes therethrough and is applied to one input of the AND circuit 102. Since the first timing pulse 25 has enabled the storage circuit 105 signals are supplied to the inputs of the comparing circuits 100 and 101 which, when compared to the outputs on the leads 91 and 93 of the code network 80 (assuming the indicia is in the correct position) will provide signals at two more of the inputs to the AND circuit 102. The gate at the output of the delay circuit 103 has sufficient width so that it is still prevalent on the fourth input of the AND circuit 102, and the AND circuit 102 provides an output pulse to the terminal 112 which actuates the print wheel.

In a similar manner, the remaining timing marks and indicia react in the circuitry. Whenever an indicia is incorrectly placed, the comparson circuits 100 to 101 do not provide a signal at the output, and the AND circuit 102 does not supply a pulse to the terminal 112. Thus, the print wheel is not activated and a wrong answer is indicated. Whenever two or more indicia are placed in a single row of possible positions, two or more of the amplifiers 27 through 30 provide an output to the multi-mark detection circuit 83 which in turn provides an output at the terminal 109 to deactivate the print hammer. The multi-mark detection circuit 83 may be any circuit which provides an output when one or more input signals are supplied thereto, such as a plurality of AND circuits (six in the present example) interconnected between the four inputs. When the end of the test paper 11 is reached, no more reflected light is supplied to the light sensitive devices 15 through 18, and all of the amplifiers 27 through 30 supply an output signal all of which are simultaneously applied to the AND circuit 84 which in turn supplies a signal to the terminal 110 that resets the count and decode circuit 104 and the print wheel.

The print wheel and the print hammer are not illustrated since they are standard types of apparatus for indicating various occurrences, such as correct and/or incorrect answers on a test paper, and it should be understood that any standard device might be utilized. The various logic and storage circuits are illustrated in block form for simplicity, and the entire circuitry therein is not shown because each of the various blocks contains standard circuitry well known to those skilled in the art, and only the manner of connecting the various blocks together is believed to be novel. Also, some of the various blocks could contain a variety of circuitry well known to those skilled in the art and it is fully intended that all of these various embodiments come within the scope of this invention.

While we have shown and described a specific embodiment of this invention, further modifications and improvements will occur to those skilled in the art. We desire it to be understood, therefore, that this invention is not limited to the particular form shown, and we intend in the appended claims to cover all modifications which do not depart from the spirit and scope of this invention.

What is claimed is:

1. Photoelectric sensing apparatus for sensing the position of a series of indicia each placed on a desired piece of material in a particular one of a plurality of positions relative to a series of timing marks predisposed on the piece comprising:
   (a) light producing means for providing rays of light directed to impinge on the desired piece of material when said piece is correctly positioned relative to said sensing apparatus;
   (b) a plurality of light sensitive means mounted to simultaneously each receive light from one of a plurality of designated areas and each providing an electric signal having an amplitude dependent upon the amount of light received, each of said designated areas being disposed to simultaneously coincide with one of the positions in one of said plurality of positions on the desired piece of material when said piece is correctly positioned relative to said sensing apparatus;
   (c) said sensing apparatus being adapted to have the desired piece of material moved slowly relative and adjacent thereto so that each plurality of positions coincides with said designated areas within some predetermined time relative to the coincidence of a timing mark with one of said designated areas and the light sensitive means associated with said one designated area producing a series of electric timing signals in response to the coincidence of the series of timing marks with said one designated area;
   (d) an electronic amplifier connected to each of said light sensitive means for receiving the electric signals from each of said light sensitive means and providing an output signal when the amplitude of the electric signal applied thereto corresponds with a predetermined amplitude;
   (e) signal providing means being conditionable to provide a series of preselected signals and providing certain of the preselected signals at an output in response to timing signals applied to an input thereof;
   (f) means connecting the output signals of the electronic amplifier receiving the electric timing signals to the input of said signal providing means;
   (g) electronic circuitry connected to receive and compare the output signals of said electronic amplifiers and the series of preselected signals at the output of said signal providing means; and
   (h) means for indicating irregularities between the output signals and the preselected signals.

2. Photoelectric sensing apparatus as set forth in claim 1 wherein the light received by the light sensitive means is reflected from the desired piece of material.

3. Photoelectric sensing apparatus as set forth in claim 1 having in addition means connected to receive the output signals from each of the amplifiers for deactivating the indicating means when more than one of said amplifiers provide output signals simultaneously.

4. Photoelectric sensing apparatus as set forth in claim 1 wherein the signal providing means includes storage means for receiving a series of preselected signals therein and providing certain of the preselected signals at an output in response to electric timing signals received at an input.

5. Photoelectric sensing apparatus as set forth in claim 4 having in addition switching means for connecting the output signals of the amplifiers to the storage means so that preselected signals are received therein upon passing a piece of material through said sensing apparatus having an exemplary positioned series of indicia thereon.

6. Photoelectric sensing apparatus as set forth in claim 1 wherein the electronic amplifiers each include a differential amplifying stage having first and second inputs with said second input connected directly to the associated light sensitive means and said first input connected to the associated light sensitive means through a resistor-capacitor network such that the portion of the differential amplifying stage associated with said second input is normally conducting when the associated light sensitive means is receiving light and the portion of the differential amplifying stage associated with said first input is conducting when the amplitude of the electric signal provided by the associated light sensitive means drops below a predetermined percentage of the normal amplitude.

7. Photoelectric sensing apparatus as set forth in claim 1 having in addition operatively positioned therein a piece of material including:
   (a) a sheet of paper having at least one generally straight edge;
   (b) said sheet of paper having specifically indicated thereon a series of indicia receiving locations with each location having a plurality of positions in which an indicia can be placed;
   (c) said series of locations being spaced apart and approximately equally spaced from said straight edge with each position of said plurality of positions substantially aligned in one direction with the similar position in all of the remaining locations; and
   (d) a timing mark associated with each location and spaced therefrom, said timing marks being approximately aligned with one position in said associated location so as to be approximately aligned with the similar positions in all of the remaining locations.

8. A piece of material for use with apparatus of the class described, comprising:
   (a) a generally rectangular shaped sheet of paper having longitudinal and transverse axes, and at least one generally straight edge parallel with one of said axes, said straight edge providing a reference edge for guiding the movement of the paper through sensing apparatus;
   (b) said sheet of paper having specifically indicated thereon a series of indicia receiving locations with each location having a plurality of positions in which an indicia can be placed;
   (c) said plurality of positions of each location being generally equally spaced to form rows generally perpendicular to said straight edge of said sheet of paper and said series of locations being equally spaced with each position of said plurality of positions therein being aligned with similar positions of adjacent locations to form lines generally parallel with the straight edge of said sheet; and
   (d) a plurality of timing marks, one of said timing marks preceding each location in sequence and said timing marks being aligned with one of said lines of positions.

9. Photoelectric sensing apparatus for sensing the position of each indicia in a series of indicia, each indicia being placed on a sheet of paper in a particular position in a row of positions with each row having associated therewith a timing mark predisposed on the sheet, comprising:
   (a) light producing means for producing rays of light directed to impinge on the sheet of paper;
   (b) light sensitive means mounted to receive light from a row of positions correctly located relative to said light sensitive means and for providing signals indicative of a particular position in the row having an indicia therein and further signals in response to timing marks correctly located with respect thereto;

(c) means for moving the sheet of paper through said apparatus to sequentially, correctly locate the rows of positions relative to said light sensitive means, said moving means further moving the sheet of paper so that the timing mark associated with each of the rows precedes the associated row in location relative to said light sensitive means; and (d) electronic means including storage means connected to said light sensitive means for comparing the signals from said light sensitive means indicative of the particular position of an indicia in a row to internally stored signals indicative of the correct position of an indicia in a row, the preceding signal indicative of timing marks being utilized to extract the correct internally stored signals from the storage means.

10. Photoelectric sensing apparatus as set forth in claim 9 wherein the light sensitive means includes a plurality of light sensitive devices and one of said devices is mounted to sense the occurrence of an indicia in one position of a row as well as the preceding timing marks.

References Cited

UNITED STATES PATENTS

| | | | |
|---|---|---|---|
| 3,267,258 | 8/1966 | Bene | 35—48 X |
| 3,037,076 | 5/1962 | Williams et al. | 250—219 X |
| 3,229,073 | 1/1966 | Macker et al. | 235—61.11 |
| 3,234,392 | 2/1966 | Dickinson | 250—219 |
| 3,408,482 | 10/1968 | Busby | 235—61.11 |

WALTER STOLWEIN, Primary Examiner

U.S. Cl. X.R.

35—48; 235—61.12